United States Patent
Lin et al.

(10) Patent No.: US 11,976,145 B2
(45) Date of Patent: May 7, 2024

(54) AQUEOUS POLYMER DISPERSION

(71) Applicants: DOW GLOBAL TECHNOLOGIES LLC, Midland, MI (US); ROHM AND HAAS COMPANY, Collegeville, PA (US)

(72) Inventors: Daoshu Lin, Shanghai (CN); Jianming Xu, Shanghai (CN); Hui Liu, Shanghai (CN); Yunfei Lan, Shanghai (CN)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/974,667

(22) Filed: Oct. 27, 2022

(65) Prior Publication Data

US 2023/0064051 A1 Mar. 2, 2023

Related U.S. Application Data

(62) Division of application No. 16/634,985, filed as application No. PCT/CN2017/095160 on Jul. 31, 2017, now abandoned.

(51) Int. Cl.
| | |
|---|---|
| *C08F 2/26* | (2006.01) |
| *C08F 212/08* | (2006.01) |
| *C08F 220/06* | (2006.01) |
| *C08F 220/14* | (2006.01) |
| *C08F 220/56* | (2006.01) |
| *C09D 5/02* | (2006.01) |
| *C08F 220/18* | (2006.01) |
| *C08F 230/08* | (2006.01) |

(52) U.S. Cl.
CPC ............. *C08F 2/26* (2013.01); *C08F 212/08* (2013.01); *C08F 220/06* (2013.01); *C08F 220/14* (2013.01); *C08F 220/56* (2013.01); *C09D 5/028* (2013.01); *C08F 220/1804* (2020.02); *C08F 230/085* (2020.02)

(58) Field of Classification Search
CPC ........ C09D 5/028; C08F 2/26; C08F 230/085; C08F 212/08; C08F 220/1804; C08F 220/06; C08F 220/14; C08F 220/56
USPC .......................................... 524/460
See application file for complete search history.

(56) References Cited

U.S. PATENT DOCUMENTS

| | | | |
|---|---|---|---|
| 6,162,545 A | 12/2000 | Kamiyama et al. | |
| 6,380,308 B1 | 4/2002 | Wamprecht et al. | |
| 6,630,533 B2 | 10/2003 | Konopka et al. | |
| 2009/0203832 A1 | 8/2009 | Muller et al. | |
| 2013/0182324 A1* | 7/2013 | Inui ............................ | C09J 7/22 524/561 |
| 2014/0323753 A1* | 10/2014 | Ogasawara ........... | C07F 9/3808 558/186 |
| 2016/0257837 A1* | 9/2016 | Zhang ...................... | C08K 5/11 |
| 2016/0280905 A1* | 9/2016 | Zhang ................... | C08F 255/02 |
| 2017/0327602 A1 | 11/2017 | Ogasawara et al. | |

FOREIGN PATENT DOCUMENTS

| | | |
|---|---|---|
| AU | 2013200757 B2 | 6/2014 |
| CN | 102272214 B | 10/2013 |
| CN | 101977974 B | 5/2014 |
| CN | 104105727 | 10/2014 |
| CN | 106164112 A | 11/2016 |
| JP | H05330885 A | 12/1993 |
| JP | 2011089014 A | 5/2011 |

OTHER PUBLICATIONS

Fox, T. G., Bulletin of the American Physical Society, 1956, vol. 1, No. 3.
Peyer, P., "Glass Transition Temperatures of Polymers," Polymer Handbook, p. 214-227, Interscience Publishers.

* cited by examiner

*Primary Examiner* — Kelechi C Egwim
(74) *Attorney, Agent, or Firm* — Susan M. Zerull

(57) ABSTRACT

The present invention provides an aqueous polymer dispersion and an aqueous coating composition comprising such aqueous polymer dispersion and providing coatings with improved early water blister resistance as well as satisfactory water streaking resistance and good durability properties.

11 Claims, No Drawings

AQUEOUS POLYMER DISPERSION

CROSS REFERENCE TO RELATED APPLICATION

This application is a divisional of the U.S. Provisional patent application Ser. No. 16/634,985, filed on Jan. 29, 2020, which is a 371 of International Patent Application No: PCT/CN2017/095160, filed Jul. 31, 2017, contents of which are incorporated herein in their entirety by reference.

FIELD OF THE INVENTION

The present invention relates to an aqueous polymer dispersion and an aqueous coating composition comprising the same.

INTRODUCTION

Aqueous or waterborne coating compositions are becoming increasingly more important than solvent-based coating compositions for less environmental problems. For exterior coating applications where coatings are routinely exposed to the outdoors, aqueous coating compositions need to quickly develop water resistance and resistance to water streaking as well as provide coatings with good durability to sustain from ultraviolet (UV) exposure.

The water streaking resistance and early water blister resistance can be improved by incorporation of hydrophobic monomers. U.S. Pat. No. 6,630,533B2 relates to an exterior finishing composition to improve dirt pick-up resistance, wet abrasion resistance, washout resistance and water blush resistance. The composition comprises: a) from 3 to 65 weight % based on weight of said composition of a polymer comprising hydrophobic monomers as polymerized units (i.e., from 20 to 100 parts by weight of said polymer of at least one $C_{12}$ to $C_{40}$ alkyl ester of (meth)acrylic acid), and a rheology modifier. The polymer is prepared by emulsion process in the presence of non-polymerizable anionic surfactants such as sodium lauryl sulfate. There remains a need to further improve early water blister resistance and minimize the use of costly hydrophobic monomers.

It is therefore desired to provide a cost effective solution with good early water blister resistance and satisfactory water streaking resistance while maintaining good durability for exterior applications.

SUMMARY OF THE INVENTION

The present invention provides a novel aqueous dispersion of a polymer that is obtained from a monomer mixture comprising a novel combination of a specific polymerizable surfactant, an ethylenically unsaturated monomer carrying at least one alkoxysilane functionality, and a styrene monomer. An aqueous coating composition comprising such aqueous polymer dispersion provides coatings with surprisingly good early water blister resistance and satisfactory water streaking resistance while maintaining good durability.

In a first aspect, the present invention is an aqueous polymer dispersion comprising a polymer, wherein the polymer comprises, based on the weight of the polymer, (a) from 0.55% to 5% by weight of structural units of a polymerizable surfactant having the structure of formula (I),

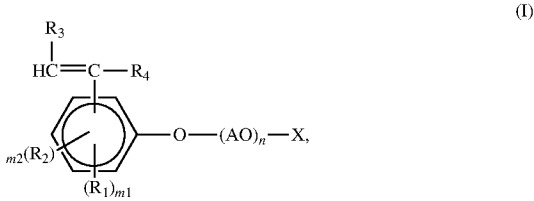

(I)

wherein $R_1$ is a phenyl group or a phenyl substituted alkyl group; m1 is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;

(b) from 0.15% to 2% by weight of structural units of an ethylenically unsaturated monomer carrying at least one alkoxysilane functionality; and (c) from 5% to 40% by weight of structural units of a styrene monomer.

In a second aspect, the present invention is an aqueous coating composition comprising an aqueous polymer dispersion of the first aspect.

DETAILED DESCRIPTION OF THE INVENTION

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

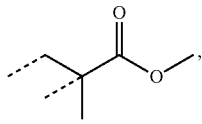

where the dotted lines represent the points of attachment of the structural unit to the polymer backbone.

The aqueous polymer dispersion of the present invention comprises a polymer. The polymer useful in the present invention comprises structural units of one or more polymerizable surfactants. The polymerizable surfactant may have the structure of formula (I),

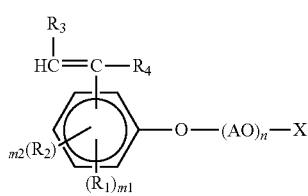

wherein $R_1$ is a phenyl group or a phenyl substituted alkyl group;

m1 is 1, 2, 3 or 4, preferably from 1 to 3;

$R_2$ is an alkyl or a substituted alkyl, preferably a $C_1$-$C_4$ alkyl or a substituted $C_1$-$C_4$ alkyl;

m2 is 0 or 1, preferably 0;

$R_3$ is hydrogen or a $C_1$-$C_{20}$ or $C_1$-$C_4$ alkyl group such as methyl;

$R_4$ is hydrogen or a $C_1$-$C_{20}$ or $C_1$-$C_4$ alkyl group such as methyl;

A represents an alkylene group or a substituted alkylene group, having 2 to 4 carbon atoms, such as ethylene, propylene, and butylene; preferably, an ethylene group;

n represents an average addition mole number of alkylene oxide. n is an integer of 1 or more, 2 or more, 3 or more, 4 or more, or even 5 or more, and at the same time, 100 or less, 60 or less, 50 or less, 40 or less, or even 20 or less; preferably, from 5 to 20; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$-COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue. Preferably, X represents —$SO_3M$.

In some embodiments, A is an ethylene group and n is an integer ranging from 5 to 20.

In one preferred embodiment, the polymerizable surfactant has the structure of formula (II),

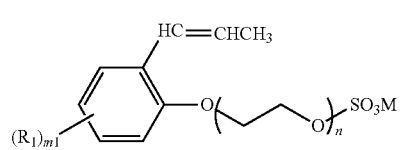

wherein $R_1$, $m_1$, and n are as defined above in formula (I), and M is a counter ion such as $NH_4^+$, $Li^+$, $Na^+$ or $K^+$.

In formula (I) or (II), preferred $R_1$ is a phenyl substituted alkyl group having the structure of

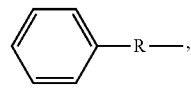

wherein R is an alkylene group having one to four carbon atoms, preferably two to three carbon atoms, such as for example,

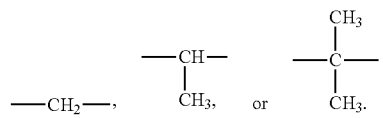

Preferred m1 is 3. More preferably, in formula (II), m1 is 3; n is in the range of from 5 to 20; and $R_1$ is

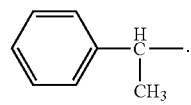

The polymer useful in the present invention may comprise, by weight based on the weight of the polymer, 0.55% or more, 0.6% or more, 0.65% or more, 0.7% or more, 0.75% or more, 0.8% or more, 0.85% or more, 0.9% or more, 0.95% or more, 1.0% or more, 1.05% or more, or even 1.1% or more, and at the same time, 5% or less, 4.5% or less, 4% or less, 3.5% or less, 3% or less, 2.5% or less, 2% or less, 1.5% or less, or even 1.3% or less, of structural units of the polymerizable surfactant. "Weight of the polymer" in the present invention refers to the dry or solid weight of the polymer.

The polymer useful in the present invention may further comprise structural units of one or more ethylenically unsaturated monomers carrying at least one alkoxysilane functionality (hereinafter "alkoxysilane functional monomer"), preferably hydrolyzable alkoxysilane functionality. Suitable alkoxysilane functional monomers include, for example, vinyltrialkoxysilanes such as vinyltrimethoxysilane; alkylvinyldialkoxysilanes; (meth)acryloxyalkyltrialkoxysilanes such as (meth)acryloxyethyltrimethoxysilane and (meth)acryloxypropyltrimethoxysilane; derivatives thereof, and combinations thereof. The polymer may comprise, by weight based on the weight of the polymer, 0.15% or more, 0.2% or more, 0.3% or more, 0.4% or more, or even 0.5% or more, and at the same time, 2% or less, 1.5% or less, 1.3% or less, 1.0% or less, 0.8% or less, 0.7% or less, or even 0.6% or less, of structural units of the alkoxysilane functional monomer.

The polymer useful in the present invention may further comprise structural units of one or more styrene monomers. The styrene monomers may include styrene, substituted styrene, or mixtures thereof. The substituted styrene may include, for example, benzyl acrylate, 2-phenoxyethyl acrylate, butylstryene, methylstyrene, p-methoxystyrene, or mixtures thereof. Preferred styrene monomer is styrene. The polymer may comprise, by weight based on the weight of the polymer, 5% or more, 10% or more, 15% or more, 17% or more, 19% or more, or even 21% or more, and at the same time, 40% or less, 35% or less, 30% or less, 28% or less, or even 26% or less, of structural units of the styrene monomer.

The polymer useful in the present invention may further comprise structural units of one or more additional ethylenically unsaturated monomers carrying at least one functional group (hereinafter "additional functional-group-containing ethylenically unsaturated monomer") that is different from the alkoxysilane functional monomer described above. The functional groups may be selected from a carbonyl, acetoacetoxy, acetoacetamide, ureido, amide, imide, amino, carboxyl, hydroxyl, or phosphorous group. Examples of additional functional-group-containing ethylenically unsaturated monomers include α, β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; acetoacetoxyethyl methacrylate (AAEM); vinyl phosphonic acid, allyl phosphonic acid, phosphoalkyl (meth)acrylates such as phosphoethyl (meth)acrylate, phosphopropyl (meth)acrylate, phosphobutyl (meth)acrylate, or salts thereof; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium styrene sulfonate; sodium vinyl sulfonate; sodium salt of allyl ether sulfonate; and the like; diacetone acrylamide (DAAM), acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide, methylacrylamidoethyl ethylene urea, hydroxy-functional (meth)acrylic acid alkyl ester such as hydroxyethyl methacrylate and hydroxypropyl methacrylate, or mixtures thereof. Preferred functional-group-containing ethylenically unsaturated monomers are selected from acrylic acid, methacrylic acid, acrylamide, sodium p-styrene sulfonate, or mixtures thereof. The polymer may comprise, based on the weight of the polymer, from 0.1% to 20% by weight, from 0.3% to 10% by weight, from 0.5% to 5% by weight, or from 1% to 3% by weight, of structural units of the additional functional-group-containing ethylenically unsaturated monomer.

The polymer useful in the present invention may also comprise structural units of one or more ethylenically unsaturated nonionic monomers that are different from the functional-group-containing ethylenically unsaturated monomer and the alkoxysilane functional monomer. As used herein, the term "nonionic monomers" refers to monomers that do not bear an ionic charge between pH=1-14. Suitable ethylenically unsaturated nonionic monomers may include, for example, monoethylenically unsaturated nonionic monomers include alkyl esters of (methyl) acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, (meth)acrylonitrile, or mixtures thereof. Preferably, the ethylenically unsaturated nonionic monomers are selected from the group consisting of methyl methacrylate, ethyl acrylate, butyl acrylate, and 2-ethylhexyl acrylate. The polymer may comprise, based on the weight of the polymer, from 35% to 94.35% by weight or from 40% to 80% by weight, of structural units of the ethylenically unsaturated nonionic monomers.

In some embodiments, the polymer comprises, based on the weight of the polymer, from 0.5% to 3% by weight of structural units of the polymerizable surfactant, from 0.2% to 1.0% by weight of structural units of the ethylenically unsaturated monomer carrying at least one alkoxysilane functionality;

from 15% to 30% by weight of structural units of styrene; and the rest being the additional functional-group-containing ethylenically unsaturated monomer and/or the ethylenically unsaturated nonionic monomer.

The polymer useful in the present invention may be prepared by free radical polymerization, preferably emulsion polymerization, of a monomer mixture comprising the polymerizable surfactant, the ethylenically unsaturated monomer carrying at least one alkoxysilane functionality, the styrene monomer and optionally, other monomers described above. Total weight concentration of the monomer mixture for preparing the polymer is equal to 100%. The monomer mixture may be added neat or as an emulsion in water; or added in one or more additions or continuously, linearly or nonlinearly, over the reaction period of preparing the polymer. Temperature suitable for emulsion polymerization process may be lower than 100° C., in the range of from 30° C. to 95° C., or in the range of from 50° C. to 90° C.

In the polymerization process of preparing the polymer, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of the monomer mixture. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

In the polymerization process of preparing the polymer, one or more additional surfactants may be used. The additional surfactants are different from the polymerizable surfactant having the structure of formula (I) described above. The additional surfactant may be added prior to or during the polymerization of the monomer mixture, or combinations thereof. A portion of the additional surfactant can also be added after the polymerization. These additional surfactants may include anionic and/or nonionic emulsifiers. Examples of suitable additional surfactants include RHODAFAC RS-610 alkyl ethoxylated phosphate available from Solvay S. A., DISPONIL FES 32 fatty alcohol ether sulfate available from BASF, TERGITOL™ 15-S-40 secondary alcohol ethoxylate, available from Dow Chemical Company (TERGITOL is a trademark of The Dow Chemical Company), or mixtures thereof. The additional surfactant may be used in an amount of from 0 to 3% by weight, from 0.5% to 2.5%, or from 0.7% to 1.5% by weight, based on the total weight of the monomer mixture used for preparing the polymer.

In the polymerization process of preparing the polymer, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the polymer. The chain transfer agent may be used in an amount from 0 to 1% by weight, from 0.1% to 0.5% by weight, or from 0.15% to 0.4% by weight, based on the total weight of the monomer mixture used for preparing the polymer.

After completing the polymerization of the polymer, the obtained polymer may be neutralized by one or more bases as neutralizers to a pH value, for example, at least 6, from 6 to 10, or from 7 to 9. The bases may lead to partial or complete neutralization of the ionic or latently ionic groups of the polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The polymer useful in the present invention may have an average particle size of from 50 nanometers (nm) to 500 nm, from 80 nm to 200 nm, or from 90 nm to 150 nm, as measured by a Brookhaven BI-90 or 90Plus Particle Sizer.

The aqueous polymer dispersion of the present invention may further comprise water. The concentration of water may be, by weight based on the total weight of the aqueous polymer dispersion, from 30% to 90%, from 40% to 80%, or from 45% to 70%.

The aqueous coating composition of the present invention comprising the aqueous polymer dispersion. The aqueous coating composition may also comprise one or more pigments and/or extenders. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 15% to 65%, from 30% to 60%, or from 40% to 55%. PVC of a coating composition may be determined according to the following equation:

$$PVC = \frac{\text{volume of pigment(s)} + \text{volume of extender(s)}}{\text{total dry volume of coating}} * 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total weight of the aqueous coating composition, in an amount of generally from 0 to 0.5%, from 0.05% to 0.4%, or from 0.1% to 0.3%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HMHEC, HEUR, or combinations thereof. The thickener may be present, based on the total weight of the aqueous coating composition, in an amount of generally from 0 to 1.0% by weight, from 0.1% to 0.8% by weight, or from 0.2% to 0.6% by weight.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, TRITON™ CF-10 nonionic wetting agent available from The Dow Chemical Company (TRITON is a trademark of The Chemical Company), SURFYNOL 10 nonionic wetting agent based on an actacetylenic diol available from Air Products, BYK-346 and BYK-349 polyether-modified siloxanes both available from BYK, or mixtures thereof. The wetting agent may be present, based on the total weight of the aqueous coating composition, in an amount of from 0 to 1.0% by weight, from 0.1% to 0.8% by weight, or from 0.2% to 0.6% by weight.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, based on the total weight of the aqueous coating composition, in an amount of from 0 to 3.0% by weight, from 0.1% to 2.0% by weight, or from 0.2% to 1.5% by weight.

The aqueous coating composition of the present invention may further comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The molecular weight of such polyacids may be in the range of from 1,000 to 50,000, from 1,200 to 40,000, from 1,500 to 20,000, from 2,000 to 15,000, or from 2,500 to 10,000, as measured by Gel Permeation Chromatography (GPC) (column: One PLgel GUARD columns (10 μm, 50×7.5 mm) and One Mixed B columns (7.8×300 mm) in tandem; and calibration: PL Polystyrene Narrow standards with molecular weights ranging from 2329000 to 580 g/mol, using polynom 3 fitness). The dispersant may be present, based on the total weight of the aqueous coating composition, in an amount of from 0 to 1.0% by weight, from 0.1% to 0.8% by weight, or from 0.2% to 0.6% by weight.

In addition to the components described above, the aqueous coating composition of the present invention may further comprise any one or combination of the following additives: buffers, neutralizers, humectants, mildewcides, biocides, anti-skinning agents, colorants, flowing agents, crosslinkers, anti-oxidants, plasticizers, leveling agents, thixotropic agents, adhesion promoters, and grind vehicles. When present, these additives may be present in a combined amount of from 0 to 1% by weight or from 0.1% to 0.8% by weight, based on the total weight of the aqueous coating composition.

The aqueous coating composition of the present invention may further comprise water. The concentration of water may be, by weight based on the total weight of the coating composition, from 30% to 90%, from 40% to 80%, or from 45% to 70%.

The aqueous coating composition of the present invention may be prepared by admixing the aqueous polymer dispersion, and optionally, the pigment and other components as described above. Components in the aqueous coating composition may be mixed in any order to provide the aqueous coating composition of the present invention. Any of the above-mentioned optional components may also be added to the composition during or prior to the mixing to form the aqueous coating composition. The pigments and/or extenders are preferably mixed with the dispersant to form a slurry of pigments and/or extender.

The polymer in the aqueous polymer dispersion of the present invention made from the combination of the polymerizable surfactant, the ethylenically unsaturated monomer carrying at least one alkoxysilane functionality, and the styrene monomer can demonstrate synergetic effects on the improvement of early water blister resistance of coatings made therefrom while still providing coatings with satisfactory water streaking and good durability. The aqueous coating composition, upon drying, or allowing to dry, can provide a coating obtained therefrom with surprisingly improved early water blister resistance with rating of 8 or higher or even 10, satisfactory water streaking resistance as indicated by a water streaking rating of 6 or higher, as well as good durability as indicated by a QUV test rating of 6 or higher. The early water blister resistance, the water streaking, and the durability properties may be measured according to the test methods described in the Examples section below.

The present invention also relates to a method of forming a coating, comprising: forming the aqueous coating composition, applying the aqueous coating composition to a substrate, and drying, or allowing to dry the aqueous coating composition to form the coating. After the aqueous coating composition of the present invention has been applied to a substrate, the aqueous coating composition can dry, or allow to dry, to form a film (this is, coating) at room temperature (20-25° C.), or at an elevated temperature, for example, from 35° C. to 60° C. The aqueous coating composition can be used alone, or in combination with other coatings to form multi-layer coatings. The aqueous coating composition of the present invention are useful as coatings on various substrates, where early water blister resistance of the coatings is important, such as those surfaces which are routinely exposed to the outdoors. The aqueous coating composition can be applied to, and adhered to, various substrates. Examples of suitable substrates include wood, metals, plastics, foams, stones, elastomeric substrates, glass, wall paper, fabrics, medium-density fiberboards (MDF), particle boards, gypsum boards, concrete, or cementious substrates. The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used.

The aqueous coating composition is suitable for various applications such as marine and protective coatings, automotive coatings, traffic paint, Exterior Insulation and Finish Systems (EIFS), roof mastic, wood coatings, coil coatings, plastic coatings, can coatings, architectural coatings, and civil engineering coatings. The aqueous coating composition is particularly useful for architectural coatings.

EXAMPLES

Some embodiments of the invention will now be described in the following Examples, wherein all parts and percentages are by weight unless otherwise specified.

Styrene (ST), butyl acrylate (BA), and methyl methacrylate (MMA) are all available from Langyuan Chemical Co., Ltd.

Sodium p-styrene sulfonate (SSS), acrylamide (AM), acrylic acid (AA), $Na_2CO_3$, $NH_4OH$, tert-Butyl hydroperoxide (t-BHP), ammonia persulfate (APS), sodium bisulfite (SBS), ascorbic acid (IAA), $FeSO_4.7H_2O$, and ethylenediaminetetraacetic acid (EDTA) are all available from Sinopharm Chemical Reagent Co., Ltd.

SILQUEST A-171 ("A-171") vinyl tri-methoxysilane, SILQUEST A-187 ("A-187") 3-glycidoxy propylthrimethoxy silane, and SILQUEST A-1120 ("A-1120") aminoethylamino propyltrimethoxy silane, are all available from Momentive Chemical.

RHODAFAC RS-610 ("RS-610") non-reactive surfactant, available from Rhodia, is a branched alcohol ethoxylate based phosphate.

SOPROPHOR WA 1802 ("WA 1802") non-reactive surfactant, available from Rhodia, is an ammonia alkoxylated tristyrylphenol sulfonate.

DISPONIL A-19 ("A-19") surfactant, available from BASF Company, is sodium dodecyl (Linear) benzene sulfonate surfactant.

LATEMUL PD-104 ("PD-104") surfactant, available from Kao Corporation, is a polymerizable sulfonate surfactant with ethylene oxide and butylene oxide units.

HITENOL AR-1025 ("AR-1025") surfactant, available from Dai-ichi kogyo seiyaku Co., Ltd., is a polymerizable alkoxylated tristyrylphenol sulfonate surfactant.

PRIMAL™ DC-420 binder is available from The Dow Chemical Company.

TRITON CF-10 ("CF-10") wetting agent is available from The Dow Chemical Company.

NATROSOL 250 HBR hydroxyethylcellulose (HEC) thickener is available from Hercules Incorporated.

Ti-Pure R-902 and Ti-Pure R-706 titanium dioxide are both available from DuPont.

FOAMASTER NXZ ("NXZ") defoamer is available from BASF.

DISPERLAIR CF-246 defoamer is available from Blackburn Chemicals.

CC-700 and Talc 800 extenders are available from Guangfu Building Materials Group.

AMP-95 neutralizer is available from ANGUS Chemical Company.

TEXANOL ester alcohol, available from Eastman Chemical Company, is used as a coalescent.

Propylene glycol, available from The Dow Chemical Company, is used as anti-freeze-thaw agent.

OROTAN™ CA-2500 ("CA-2500") dispersant, OROTAN 731A ("731A") dispersant, ROCIMA™ 363 and KATHON™ LXE biocides, ROPAQUE Ultra E opaque polymer, ACRYSOL™ RM-2020 NPR ("RM-2020") hydrophobically modified ethylene oxide urethane (HEUR) rheology modifier, ACRYSOL RM-8W ("RM-8W") nonionic urethane rheology modifier, and CELLOSIZE™ QP-15000H ("QP-15000H") hydroxyethyl cellulose (HEC) thickener, are all available from The Dow Chemical Company.

OROTAN, ROCIMA, KATHON, ACRYSOL, PRIMAL and CELLOSIZE are trademarks of The Dow Chemical Company.

The following standard analytical equipment, test methods and synthesis process are used in the Examples.

Particle Size Measurement (BI-90)

Particle size of a polymer in an aqueous polymer dispersion was measured by using Brookhaven BI-90 or 90Plus Particle Sizer, which employs the technique of photon correlation spectroscopy (light scatter of sample particles). This method involved diluting 2 drops of a polymer dispersion to be tested in 20 ml of 0.01 M NaCl solution, and further diluting the resultant mixture in a sample cuvette to achieve a desired count rate (K) (e.g., K ranging from 250 to 500 counts/sec for diameter in the range of 10-300 nm, and K ranging from 100 to 250 counts/sec for diameter in the range of 300-500 nm). Then the particle size of the aqueous polymer dispersion was measured and reported as an average diameter by intensity.

Water Streaking Test

Water streaking resistance was evaluated according to the ASTM D7190-10 method (Standard practice to evaluate leaching of water soluble materials from latex paint films). 100 grams (g) of the test paint formulation were added with 4 g of phthalate blue colorant, stirred evenly and equilibrated overnight. Then the resultant tinted white paint was drawn down on a black white vinyl chart to form a 100 μm wet film, and dried at room temperature (RT) for 4 hours. 3 mL of deionized (DI) water droplets were placed on the top of the paint film and the water droplets were allowed to stand for 3 minutes. Then the panel was lifted into a vertical position so the water droplets ran down the paint film. The panel was then allowed to dry at RT before leaching. The paint film was rated on a relative scale of 1-10 as follows, 10: No obvious visually water streaking on the paint surface;

9-8: less than 10% shinning edge of the paint surface;

7-6: 10%≤shinning edge≤30%;

5-4: 30%≤shinning edge ≤60% and visible gloss loss;

3-2: 60%≤shinning edge≤100% and visible color change;

1: Severe blister appeared after the water droplets were placed on the paint film.

The rating of 6 or higher indicates satisfactory water streaking resistance. The higher the rating, the better the water streaking resistance. Otherwise, if the rating is less than 6, it indicates unacceptable water streaking resistance.

Early Water Blister Resistance Test

The early water blister resistance test was conducted according to the ASTM D714-87 method (Standard test method for evaluating degree of blistering of paints).

A primer (comprising, by weight based on the total weight of the primer, 16% DI water, 1.5% propylene glycol, 0.2% QP-15000H, 0.11% ammonia, 0.8% 731A, 0.2% CF-10, 0.2% KATHON LXE, 0.15% DISPERLAIR CF-246, 5% Ti-Pure R-706, 15% CC-700, 10% Talc 800, 40% PRIMAL DC-420, 4% TEXANOL, and 0.15% DISPERLAIR CF-246, 0.6% ACRYSOL RM-8W, and 6.1% DI water) was applied to a cement panel with a drawdown bar having a 100 μm opening. After drying at RT for 2 hours, the panel was further coated with the test paint formulation using a drawdown bar having a 120 μm opening. After further drying at RT for 2 hours, the resultant panel was put in a fog box chamber, and observed for surface change every half an hour and recorded till 4 hours. The paint surface was rated, based on the size and area of the water blister, on a relative scale of 1-10 as follows, 10: No visible water blister;
8-9: small blister, ≤20% of the paint surface;
6-7: small blister, >20%~≤40% of the paint surface;
4-5: small or medium blister, >40%~≤60% of the paint surface; and
1-2: medium blister, >60%~≤100% of the paint surface.

The rating of 8 or higher indicates good early water blister resistance. Otherwise, if the rating is less than 8, it indicates poor early water blister resistance. The higher the rating, the better the early water blister resistance.

Accelerated Weathering Test (QUV)

The test paint formulations were applied onto aluminum panels using an applicator to form 150 μm wet films. Then test panels dried for one week in the constant temperature room (CTR, 23±2° C.; (45-65%)±10% Relative Humidity), and then cut to size of 3"*9" to fit QUV racks. Each test panel was identified on the reverse side using a black marker, and the initial $L_0^*$, $a_0^*$, and $b_0^*$ values of each panel were obtained by a spectro-guide machine (BYK company). Meanwhile, the starting time was recorded. The test panels were put into a QUV equipment (QUV/Se QUV Accelerated Weathering Tester from Q-Lab Corporation, 340 nm light source UVA, and 0.77 w/m² irradiance intensity) with the test area facing inward. One cycle QUV consisted of 8 hour UV irradiation at 60° C. followed by 4 hour water spray at 50° C. After multiple cycles in the QUV equipment for 200 hours, all the panels were removed from the QUV equipment. These panels were dried at room temperature, and were tested for final $L_1^*$, $a_1^*$, and $b_1^*$ values. ΔE was calculated as below formula:

$$\Delta E = \sqrt{(L_1^*-L_0^*)^2+(a_1^*-a_0^*)^2+(b_1^*-b_0^*)^2}$$

The film was rated, based on ΔE values, on a relative scale of 1~10 with 10 being the best. ΔE≤1 was rated as 10, 1<ΔE≤1.5 was rated as 8-9, 1.5<ΔE<2 was rated as 6-7, and ΔE>2 was rated as 1-5. The QUV test rating of 6 or higher indicates good durability. Otherwise, if the QUV test rating is less than 6, it indicates poor durability.

Example (Ex) 1 Polymer Dispersion

A monomer emulsion (ME) was prepared by mixing 789 g of BA, 289 g of MMA, 482 g of ST, 8 g of AM, 32.5 g of AA, 5.8 g of SSS, 4.8 g of A-171, 57.56 g of AR-1025 (25% active) and 460 g of DI water, and then emulsified with stirring. Then, 640 g of DI water and 12.8 g of AR-1025 (25% active) were charged to a five-liter multi-neck flask fitted with mechanical stirring. The contents in the flask were heated to 91° C. under a nitrogen atmosphere. To the stirred flask, 2.4 g of Na$_2$CO$_3$ in 27 g of DI water, 59 g of ME with 40 g of rinse DI water, 0.02 g of FeSO$_4$.7H$_2$O and 0.07 g of EDTA in 10 g of DI water, and 5.77 g of APS in 30 g of DI water were added to the flask. The remaining monomer emulsion, 2.47 g of APS in 90 g of DI water, and 2.66 g of SBS in 90 g of DI water were added gradually over 120 minutes. Reactor temperature was maintained at 88° C. 40 g of DI water were used to rinse the monomer emulsion feed line to the flask. Thereafter, 1.48 g of t-BHP (70% active) in 15 g of DI water, and 0.67 g of IAA in 15 g of DI water were shot into the flask. Then, 3.36 g of t-BHP (70% active) in 27 g of DI water, and 1.76 g of IAA in 30 g of DI water were fed into the flask over 30 minutes with agitation. The contents in the flask were cooled to room temperature. 24 g of NH$_4$OH (25% active) in 30 g of DI water were added as a neutralizer over 10 minutes.

Ex 2 Polymer Dispersion

The polymer dispersion of Ex 2 was prepared according to the same procedure as preparing Ex 1 polymer dispersion above, except that the amounts of ST and MMA in ME were different. The monomer emulsion used in Ex 2 was prepared by emulsifying a mixture of 789 g of BA, 550 g MMA, 241 g of ST, 8 g of AM, 32.5 g of AA, 5.8 g of SSS, 4.8 g of A-171, 57.56 g of AR-1025 (25% active) and 460 g of DI water.

Ex 3 Polymer Dispersion

The polymer dispersion of Ex 3 was prepared according to the same procedure as preparing Ex 1 polymer dispersion above, except that the amount of silane in ME was different. The monomer emulsion used in Ex 3 was prepared by emulsifying a mixture of 789 g of BA, 289 g MMA, 482 g of ST, 8 g of AM, 32.5 g of AA, 5.8 g of SSS, 3.2 g of A-171, 57.56 g of AR-1025 (25% active) and 460 g of DI water.

Comparative (Comp) Ex A Polymer Dispersion

The polymer dispersion of Comp Ex A was prepared according to the same procedure as preparing Ex 1 polymer dispersion above, except that the surfactant in ME and the surfactant added directly to the flask were different. The monomer emulsion used in Comp Ex A was prepared by emulsifying a mixture of 789 g of BA, 289 g MMA, 482 g of ST, 8 g of AM, 32.5 g of AA, 5.8 g of SSS, 4.8 g of A-171, 75.74 g of A-19 (19% active) and 450 g of DI water. Then, 635 g of DI water and 16.84 g of A-19 (19% active) were charged to the five-liter multi-neck flask fitted with mechanical stirring.

Comp Ex B Polymer Dispersion

The polymer dispersion of Comp Ex B was prepared according to the same procedure as preparing Ex 1 polymer dispersion above, except that the surfactant in ME and the surfactant added directly to the flask were different. The monomer emulsion used in Comp Ex B was prepared by emulsifying a mixture of 789 g of BA, 289 g MMA, 482 g of ST, 8 g of AM, 32.5 g of AA, 5.8 g of SSS, 4.8 g of A-171, 57.56 g of RS-610 (25% active) and 460 g of DI water. Then, 640 g of DI water and 12.8 g of RS-610 (25% active) were charged to the five-liter multi-neck flask fitted with mechanical stirring.

Comp Ex C Polymer Dispersion

The polymer dispersion of Comp Ex C was prepared according to the same procedure as preparing Ex 1 polymer dispersion above, except that the surfactant in ME and the surfactant added directly to the flask were different. The monomer emulsion used in Comp Ex C was prepared by emulsifying a mixture of 789 g of BA, 289 g MMA, 482 g of ST, 8 g of AM, 32.5 g of AA, 5.8 g of SSS, 4.8 g of A-171, 49.97 g of WA 1802 (30% active) and 460 g of DI water. Then, 640 g of DI water and 10.67 g of RS-610 (30% active) were charged to the five-liter multi-neck flask fitted with mechanical stirring.

Comp Ex D Polymer Dispersion

The polymer dispersion of Comp Ex D was prepared according to the same procedure as preparing Ex 1 polymer dispersion above, except that the surfactants used in ME and added directly to the flask were different. The monomer emulsion used in Comp Ex D was prepared by emulsifying a mixture of 789 g of BA, 289 g MMA, 482 g of ST, 8 g of AM, 32.5 g of AA, 5.8 g of SSS, 4.8 g of A-171, 74.96 g of PD-104 (20% active) and 460 g of DI water. Then, 640 g of DI water and 16.01 g PD-104 (20% active) were charged to the five-liter multi-neck flask fitted with mechanical stirring.

Comp Ex E Polymer Dispersion

The polymer dispersion of Comp Ex E was prepared according to the same procedure as preparing Ex 1 polymer dispersion above, except that A-171 silane in ME was removed. The monomer emulsion used in Comp Ex E was prepared by emulsifying a mixture of 789 g of BA, 289 g of MMA, 482 g of ST, 8 g of AM, 32.5 g of AA, 5.8 g of SSS, 57.56 g of AR-1025 (25% active) and 460 g of DI water.

Comp Ex F Polymer Dispersion

The polymer dispersion of Comp Ex F was prepared according to the same procedure as preparing Ex 1 polymer dispersion above, except that the amounts of ST and MMA in ME were different. The monomer emulsion used in Comp Ex F was prepared by emulsifying a mixture of 789 g of BA, 791 g MMA, 8 g of AM, 32.5 g of AA, 5.8 g of SSS, 4.8 g of A-171, 57.56 g of AR-1025 (25% active) and 460 g of DI water.

Comp Ex G Polymer Dispersion

The polymer dispersion of Comp Ex G was prepared according to the same procedure as preparing Ex 1 polymer dispersion above, except that the amounts of ST and MMA in ME were different. The monomer emulsion used in Comp Ex G was prepared by emulsifying a mixture of 789 g of BA, 791 g of ST, 8 g of AM, 32.5 g of AA, 5.8 g of SSS, 4.8 g of A-171, 57.56 g of AR-1025 (25% active) and 460 g of DI water.

Comp Ex H Polymer Dispersion

The polymer dispersion was prepared according to the same procedure as preparing Ex 1 polymer dispersion above, except that the amount of the A-171 silane in ME was different. The monomer emulsion used in Comp Ex H was prepared by emulsifying a mixture of 789 g of BA, 289 g MMA, 482 g of ST, 8 g of AM, 32.5 g of AA, 5.8 g of SSS, 1.6 g of A-171, 57.56 g of AR-1025 (25% active) and 460 g of DI water.

Comp Ex I Polymer Dispersion

The polymer dispersion was prepared according to the same procedure as preparing Ex 1 polymer dispersion above, except that the amount of the A-171 silane in ME was different. The monomer emulsion used in Comp Ex I was prepared by emulsifying a mixture of 789 g of BA, 289 g MMA, 482 g of ST, 8 g of AM, 32.5 g of AA, 5.8 g of SSS, 0.8 g of A-171, 57.56 g of AR-1025 (25% active) and 460 g of DI water.

Comp Ex J Polymer Dispersion

The polymer dispersion was prepared according to the same procedure as preparing Ex 1 polymer dispersion above, except that surfactant type and amount in ME were different. The monomer emulsion used in Comp Ex J was prepared by emulsifying a mixture of 789 g of BA, 289 g MMA, 482 g of ST, 8 g of AM, 32.5 g of AA, 5.8 g of SSS, 0.8 g of A-171, 19.16 g of AR-1025 (25% active), 50.4 g of A-19 (19% active) and 435 g of DI water.

Comp Ex K Polymer Dispersion

The polymer dispersion of Comp Ex K was prepared according to the same procedure as preparing Ex 1 polymer dispersion above, except that A-171 silane in ME was removed, and A-187 silane was posted added to the binder after polymerization. The monomer emulsion used in Comp Ex K was prepared by emulsifying a mixture of 789 g of BA, 289 g of MMA, 482 g of ST, 8 g of AM, 32.5 g of AA, 5.8 g of SSS, 57.56 g of AR-1025 (25% active) and 460 g of DI water. After $NH_4OH$ was added as a neutralizer over 10 minutes, 4.8 g A-187 was added to the flask, and stirred for 10 minutes before filtration.

Comp Ex L Polymer Dispersion

The polymer dispersion of Comp Ex L was prepared according to the same procedure as preparing Ex 1 polymer dispersion above, except that A-171 silane in ME was removed, and A-1120 silane was post added to the binder after polymerization. The monomer emulsion used in Comp Ex L was prepared by emulsifying a mixture of 789 g of BA, 289 g of MMA, 482 g of ST, 8 g of AM, 32.5 g of AA, 5.8 g of SSS, 57.56 g of AR-1025 (25% active) and 460 g of DI water. After $NH_4OH$ was added as a neutralizer over 10 minutes, 4.8 g A-1120 was added to the flask, and stirred for 10 minutes before filtration.

Properties of the above obtained polymer dispersions are given in Table 1. These polymer dispersions were used as binders in paint formulations prepared below.

TABLE 1

Properties of polymer dispersions

| Polymer Dispersion | Particle size | pH | Solids content |
|---|---|---|---|
| Ex 1 | 109 nm | 8.51 | 47.85% |
| Ex 2 | 122 nm | 8.72 | 47.9% |
| Ex 3 | 130 nm | 8.42 | 50.2% |
| Comp Ex A | 138 nm | 8.85 | 49.5% |
| Comp Ex B | 146 nm | 8.75 | 49.5% |
| Comp Ex C | 116 nm | 8.58 | 48.38% |
| Comp Ex D | 133 nm | 8.65 | 47.27% |
| Comp Ex E | 120 nm | 8.71 | 49.7% |
| Comp Ex F | 122 nm | 8.79 | 47.9% |
| Comp Ex G | 134 nm | 8.82 | 48.5% |
| Comp Ex H | 120 nm | 8.54 | 47.6% |
| Comp Ex I | 119 nm | 8.44 | 47.7% |
| Comp Ex J | 123 nm | 8.35 | 50.3% |
| Comp Ex K | 130 nm | 8.44 | 49.9% |
| Comp Ex L | 130 nm | 8.44 | 49.9% |

Paint Formulations

Paint formulations (i.e., coating compositions) were prepared based on formulations given in Table 2. Ingredients for preparing the grind were mixed using a high speed Cowles disperser at 800 rpm for 30 minutes to form the grind. Then, ingredients in the letdown were added to the grind using a conventional lab mixer to obtain each paint formulation. Binders used in each paint formulation are given in Table 3.

TABLE 2

| Paint formulation | |
|---|---|
| Components | Weight (gram) |
| Grind stage | |
| DI Water | 70.00 |
| Propylene glycol | 7.50 |
| NATROSOL 250 HBR | 1.00 |
| FOAMASTER NXZ | 0.50 |
| TRITON CF-10 | 1.25 |
| ROCIMA 363 | 3.50 |
| AMP-95 | 1.00 |
| CA-2500 | 6.80 |
| KATHON LXE | 0.50 |
| Ti-Pure R-902 | 80.00 |
| CC-700 | 90.00 |
| Letdown | |
| Binder | 213.00 |
| TEXANOL | 6.79 |
| ROPAQUE Ultra E | 12.50 |
| FOAMASTER NXZ | 0.75 |
| ACRYSOL RM-2020 NPR | 5.00 |
| ACRYSOL RM-8W | 1.25 |
| DI Water | 10.00 |

The above obtained paint formulations were evaluated for water streaking, early water blister resistance and durability properties according to the test methods described above and results are given in Table 3.

As shown in Table 3, the binders made from the specific combination of AR-1025 surfactant and A-171 silane (Exs 1-3) provided paint films with surprisingly improved early water blister resistance with rating of 8 or higher, or even as high as 10. In the meanwhile, the paint films of Exs 1-3 also demonstrated satisfactory water streaking resistance and good durability.

It's worth mentioning that the synergetic effects between AR-1025 reactive alkoxylated tristyrylphenol surfactant and A-171 silane on improving early water blister resistance were observed. The binder synthesized in the presence of AR-1025 but no A-171 silane (Comp Ex E) provided paint films with poor early water blister resistance with rating as low as 1. Moreover, the binders synthesized by 0.3% of A-171 silane in combination with other surfactants, e.g., a non-reactive alkoxylated tristyrylphenol surfactant WA 1802 (Comp Ex C) or a reactive surfactant PD 104 without tristyrylphenol group (Comp Ex D), both provided paint films with poor early water blister resistance with rating as low as 3 and 1, respectively.

Moreover, the binders made from A-171 silane in combination with conventional A-19 (Comp Ex A) and RS-610 surfactants (Comp Ex B) provided paints with poor water streaking resistance (rating: 2). The binder of Comp Ex J prepared in the presence of 0.5% AR-1025 surfactant plus 0.6% A-19 surfactant also led to poor water streaking resistance of paint films. When the binders were made from AR-1025 and A-171 silane, free of ST or in combination with 48% ST, the paint films made therefrom showed poor water streaking resistance (rating: 3, Comp Ex F) and poor durability (QUV test rating: 3, Comp Ex G). When the binders were made from 0.1% A-171 silane (Comp Ex H) or 0.05% A-171 silane (Comp Ex I), the resultant paint films also demonstrated poor early water blister resistance. When preparing binders using non-polymerizable A-187 silane (Comp Ex K) or A-1120 silane (Comp Ex L) in an amount of 0.3%, the resultant paint films also demonstrated poor early water blister resistance.

TABLE 3

| Properties of paints films | | | | | | | | |
|---|---|---|---|---|---|---|---|---|
| | | Binder | | | | Properties of paint films | | |
| Paint Formulations | Binder name | Surfactant (%*) | ST dosage (%*) | Silane dosage (%*) | Silane Type | Water streaking resistance | Early water blister resistance | QUV |
| Paint 1 | Ex 1 | 1.1 AR-1025 | 30 | 0.3 | A-171 | 6-7 | 10 | 6 |
| Paint 2 | Ex 2 | 1.1 AR-1025 | 15 | 0.3 | A-171 | 7 | 10 | 7 |
| Paint 3 | Ex 3 | 1.1 AR-1025 | 30 | 0.2 | A-171 | 7 | 8 | 6 |
| Comp Paint A | Comp Ex A | 1.1 A-19 | 30 | 0.3 | A-171 | 2 | n.d. | 6 |
| Comp Paint B | Comp Ex B | 1.1 RS-610 | 30 | 0.3 | A-171 | 2 | n.d. | 6 |
| Comp Paint C | Comp Ex C | 1.1 WA 1802 | 30 | 0.3 | A-171 | 7 | 3 | 5 |
| Comp Paint D | Comp Ex D | 1.1 PD 104 | 30 | 0.3 | A-171 | 6 | 1 | 6 |
| Comp Paint E | Comp Ex E | 1.1 AR-1025 | 30 | 0 | | 6 | 1 | 6 |
| Comp Paint F | Comp Ex F | 1.1 AR-1025 | 0 | 0.3 | A-171 | 3 | n.d. | 9 |
| Comp Paint G | Comp Ex G | 1.1 AR-1025 | 48 | 0.3 | A-171 | 8 | n.d. | 3 |
| Comp Paint H | Comp Ex H | 1.1 AR-1025 | 30 | 0.1 | A-171 | 7 | 4 | 6 |
| Comp Paint I | Comp Ex I | 1.1 AR-1025 | 30 | 0.05 | A-171 | 7 | 2 | 6 |
| Comp Paint J | Comp Ex J | 0.5 AR-1025 + 0.6 A-19 | 30 | 0.3 | A-171 | 4 | 8 | 6 |
| Comp Paint K | Comp Ex K | 1.1 AR-1025 | 30 | 0.3 | A-187 | n.d. | 1 | n.d. |
| Comp Paint L | Comp Ex L | 1.1 AR-1025 | 30 | 0.3 | A-1120 | n.d. | 1 | n.d. |

*by weight based on the total weight of monomers

What is claimed is:

1. An aqueous coating composition comprising an aqueous polymer dispersion where the aqueous polymer dispersion comprises, based on the weight of the polymer,
   (a) from 0.55% to 5% by weight of structural units of a polymerizable surfactant having the structure of formula (I),

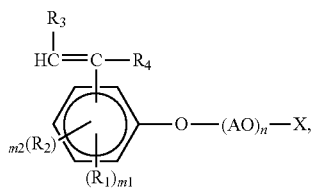

wherein $R_1$ is

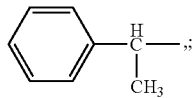

ml is 1, 2, or 3; $R_2$ is an alkyl or a substituted alkyl;
   m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—LOOM, —$PO_3M_2$, —$P(Z)O_2M$, or —CO—$CH_2$—CH($SO_3M$)—COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;
   (b) from 0.15% to 2% by weight of structural units of an ethylenically unsaturated monomer carrying at least one alkoxysilane functionality; and
   (c) from 15 to 30% by weight of structural units of a styrene monomer, wherein the polymer has an average particle size of 109 to 500 nm, and the composition is a paint, an architectural coating, or a protective coating.

2. The aqueous coating composition of claim 1, having a pigment volume concentration of from 15% to 65%.

3. The aqueous coating composition of claim 1, wherein A represents an ethylene group and n is an integer in the range of from 5 to 20.

4. The aqueous coating composition of claim 1, wherein the polymer comprises, based on the weight of the polymer, from 0.6% to 3% by weight of structural units of the polymerizable surfactant.

5. The aqueous coating composition of claim 1, wherein the polymer comprises, based on the weight of the polymer, from 0.2% to 0.5% by weight of structural units of the ethylenically unsaturated monomer carrying at least one alkoxysilane functionality.

6. The aqueous coating composition of claim 1, wherein the ethylenically unsaturated monomer carrying at least one alkoxysilane functionality is selected from the group consisting of (meth)acryloxyethyltrimethoxysilane, (meth)acryloxypropyltrimethoxysilane, vinyltrimethoxysilane, and vinyltriethoxysilane.

7. The aqueous coating composition of claim 1, wherein the polymer has a glass transition temperature of from 0 to 50° C.

8. The aqueous coating composition of claim 1, wherein the styrene monomer is styrene.

9. An aqueous coating composition comprising an aqueous polymer dispersion where the aqueous polymer dispersion comprises, based on the weight of the polymer,
   (a) from 0.55% to 5% by weight of structural units of a polymerizable surfactant having the structure of formula (I),

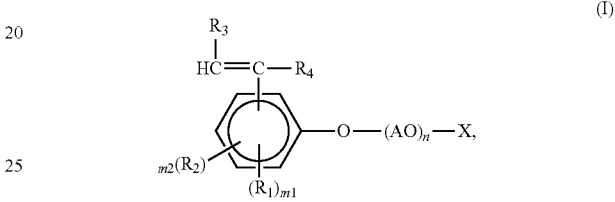

wherein $R_1$ is a phenyl group or a phenyl substituted alkyl group; ml is 1, 2, 3 or 4; $R_2$ is an alkyl or a substituted alkyl; m2 is 0 or 1; $R_3$ is hydrogen or a $C_1$-$C_{20}$ alkyl group; $R_4$ is hydrogen or a $C_1$-$C_{20}$ alkyl group; A represents an alkylene group or a substituted alkylene group, having 2 to 4 carbon atoms; n is an integer in the range of from 1 to 100; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—CH($SO_3M$)—COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue;
   (b) from 0.15% to 2% by weight of structural units of an ethylenically unsaturated monomer carrying at least one alkoxysilane functionality; and
   (c) from 15% to 30% by weight of structural units of a styrene monomer
   which provides a coating characterized by
   a blister resistance rating of 8 or higher,
   a water streaking resistance rating of 6 or higher, and
   a QUV test rating of 6 or higher.

10. A method comprising applying the aqueous coating composition of claim 1 to a substrate, and drying the substrate to provide a coating.

11. The method of claim 10 wherein the coating is characterized by one or more of
   a blister resistance rating of 8 or higher,
   a water streaking resistance rating of 6 or higher,
   a QUV test rating of 6 or higher.

* * * * *